United States Patent [19]

Moore et al.

[11] Patent Number: 5,440,623
[45] Date of Patent: Aug. 8, 1995

[54] TELEPHONE ROUTING SYSTEM WITH QUEUING AND VOICE MESSAGING CAPABILITIES

[75] Inventors: Peggy E. Moore, Aurora, Colo.; Martin R. Marks; Michael S. Crum, both of Phoenix, Ariz.

[73] Assignee: U.S. West Communications, Inc., Denver, Colo.

[21] Appl. No.: 96,945

[22] Filed: Jul. 26, 1993

[51] Int. Cl.$^6$ .............................................. H04M 1/64
[52] U.S. Cl. ..................................... 379/67; 379/212; 379/265
[58] Field of Search .................... 379/88, 89, 212, 214, 379/231, 232, 265, 266, 309, 84, 67

[56] References Cited

U.S. PATENT DOCUMENTS

| | | | |
|---|---|---|---|
| 4,602,129 | 7/1986 | Matthews et al. | 379/89 X |
| 4,747,124 | 5/1988 | Ladd | 379/214 X |
| 4,788,715 | 11/1988 | Lee | 379/84 |
| 4,896,345 | 1/1990 | Thorne | 379/214 X |
| 4,964,155 | 10/1990 | Pinard | 379/266 X |
| 5,166,974 | 11/1992 | Morganstein et al. | 379/88 X |
| 5,175,761 | 12/1992 | Khalid et al. | 379/89 |
| 5,185,781 | 2/1993 | Dowden et al. | 379/89 X |
| 5,185,782 | 2/1993 | Srinivasan | 379/88 X |
| 5,193,110 | 3/1993 | Jones et al. | 379/233 X |
| 5,309,512 | 5/1994 | Blackmon et al. | 379/142 X |

*Primary Examiner*—James L. Dwyer
*Assistant Examiner*—Daniel S. Hunter
*Attorney, Agent, or Firm*—Brooks and Kushman

[57] ABSTRACT

A telephone routing system for use with a programmable central office switch and a voice messaging system, wherein the programmable central office switch is of the type that provides prioritized features such as queuing, call forward busy line and call forward don't answer to the voice messaging system. The telephone routing system comprises a hunt group having one or more incoming telephone lines each having an individual hunt group telephone number associated with it. Each of the individual hunt group telephone numbers has a call forward busy line and call forward don't answer to the voice messaging system feature enabled but does not have a queuing feature enabled. A hunt group directory number is associated with the entire hunt group and has queuing, call forward busy line, and call forward don't answer to the voice messaging system features enabled. Calls are received by the hunt group on one of the individual hunt group telephone numbers. If all the telephone lines in the hunt group are busy, the call is forwarded to a common hunt group mailbox in the voice messaging system. The common hunt group mailbox plays a message asking if the caller wishes to leave a message or be placed in a queue If the caller wants to be placed in a queue, the call is forwarded from the hunt group mailbox to the hunt group directory number. If all the telephone lines in the hunt group are still busy and an empty slot exists in the queue, then the call is placed in the queue. If all the telephone lines in the hunt group are still busy and there are no empty slots in the queue, the call is retrieved by the voice messaging system back to the common voice message mailbox, where the caller is instructed to leave a message or call again later.

5 Claims, 3 Drawing Sheets

TELEPHONE ROUTING SYSTEM WITH QUEUING AND VOICE MESSAGING CAPABILITIES

FIELD OF THE INVENTION

The present invention relates to telephone call routing systems in general and in particular to telephone call routing systems that include voice messaging systems and programmable telephone switches.

BACKGROUND OF THE INVENTION

For medium to large businesses that receive many phone calls per day, it is common for a telephone company to provide such businesses with more than a single incoming telephone line on which to receive calls. The plurality of incoming lines are commonly configured to as a hunt group. The hunt group has a telephone number associated with it, which when dialed will cause a telephone routing system to attempt to connect the call to each of the incoming telephone lines until an idle line is found.

In addition to having more than a single incoming telephone line, many businesses subscribe to voice messaging or queuing services provided by their telephone company. For businesses that subscribe to a voice messaging service, if all the telephone lines in the hunt group are either busy or go unanswered, the voice messaging service will produce a computer-activated message instructing the caller to leave a message. The message is recorded by the voice messaging system and is stored in a computer, thereby allowing subscribers to listen to the recorded messages and call back customers who were unable to get through.

Alternatively, it is also common for businesses to subscribe to a queuing service. With a queuing service, if all the telephone lines in the hunt group are busy, a computer-activated message is produced telling the outside caller that all operators are currently busy, and that the call will be answered in the order received. While these two types of call handling features work very well for handling the majority of incoming calls, neither feature allows a caller to choose whether he or she wants to leave a message or to remain on the line until the call is answered. In the past, it was not thought to have been possible to combine these two features with currently existing telephone switching and voice messaging hardware without having to develop extensive new computer software that controls the telephone switches and voice messaging hardware in order to allow a caller to have the option of being placed in a queue or leaving a message.

There is therefore a need for a system that allows a telephone company to set up hunt groups for customers using existing hardware and software currently found in telephone switches so that the hunt groups have both voice messaging and queuing capability.

SUMMARY OF THE INVENTION

The present invention is a telephone routing system for use in a main telephone switching office having programmable central office switches and a voice messaging system (VMS). These programmable central office switches are of the type that provides prioritized features to a telephone number. Such features include queuing, call forward don't answer to the voice messaging system, and call forward busy line to the voice messaging system. The routing system includes a set of incoming telephone lines that are configured as a multi-line hunt group having a hunt group directory number associated with it. The hunt group directory number has queuing, call forward busy line to the VMS and call forward don't answer to the VMS features enabled. The multi-line hunt group has associated with it a set of individual hunt group telephone numbers that are matched to each of the incoming telephone lines. Each individual hunt group telephone number has the features call forward busy line to the VMS and call forward don't answer to the VMS enabled but does not have a queuing feature enabled.

An incoming call is received on one of the individual hunt group telephone numbers. The central office switch determines if the incoming telephone line that is associated with the individual hunt group telephone number on which the incoming call is received is busy. If so, the central office switch sequentially tries the next individual hunt group telephone number to determine if the telephone line associated with it is busy. If all the incoming telephone lines are busy, the central office switch forwards the incoming call to a voice message mailbox that is associated with the hunt group. Next, the caller is given the option of leaving a message or transferring the call to a telephone queue. If the caller wishes to be placed in a queue, the voice messaging system performs a supervised call transfer that forwards the incoming call to the hunt group directory number such that if all the incoming telephone lines that comprise the hunt group are busy and the queue includes an empty slot, the incoming call is placed in the queue. However, if any of the incoming telephone lines are not answered or all the incoming telephone lines are busy and the queue does not contain an empty slot, the incoming call is routed back to the voice message mailbox so that the caller can leave a message.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
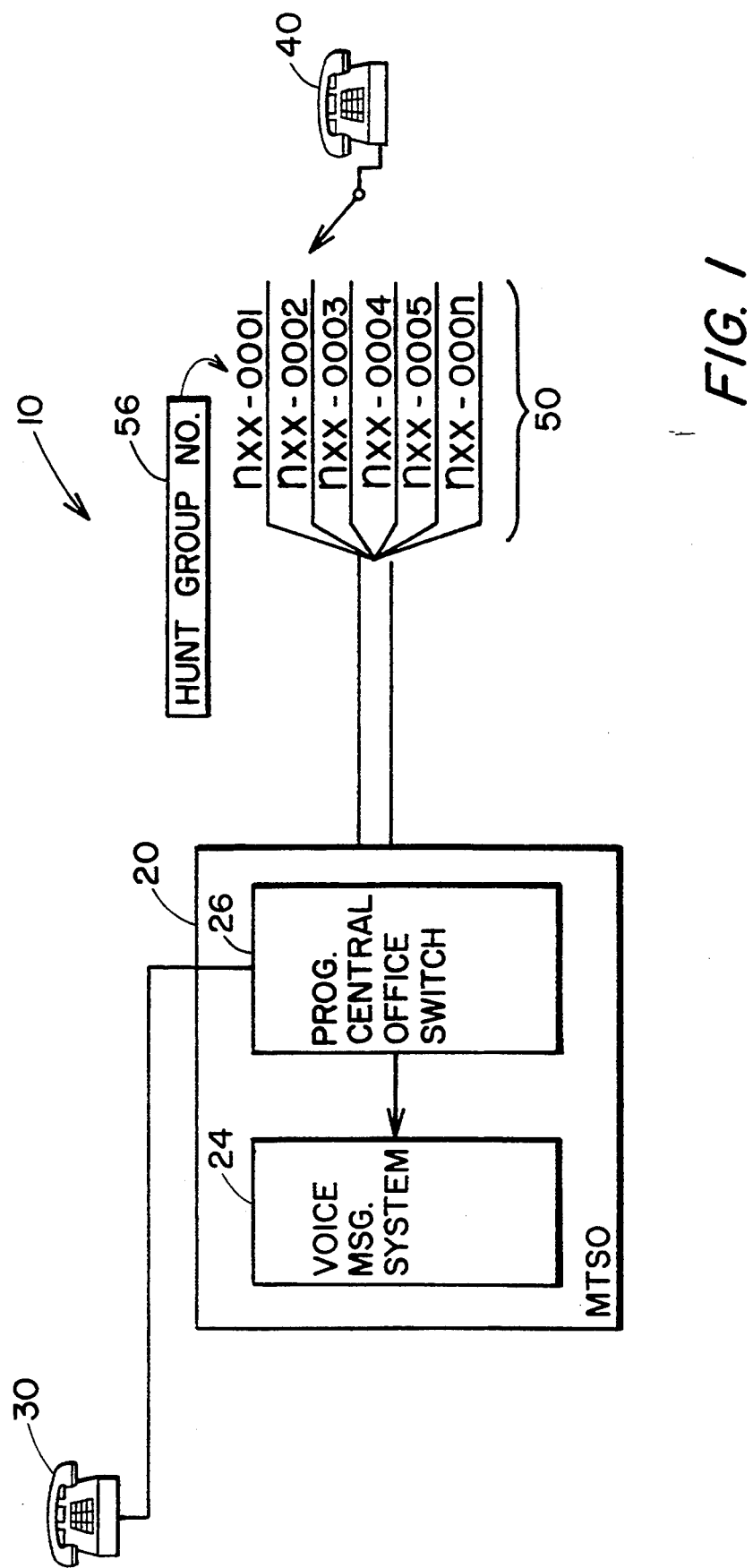
FIG. 1 is a simplified block diagram of a telephone communication system in which the present invention is implemented.

As described above, the present invention is a call routing system that is easily implemented within a conventional telephone communication system 10, as is shown in FIG. 1. The telephone communication system 10 typically includes a main telephone switching office (MTSO) that routes telephone calls to their intended destination. Included in the MTSO is a programmable central office switch 26 that connects an incoming caller's line with a telephone line of the recipient. Coupled to the programmable central office switch 26 is a voice messaging system (VMS) 24. The voice messaging system 24 is used to store and retrieve voice messages for voice message service subscribers. In the present embodiment of the invention, the programmable central office switch is a type 1AESS or a 5ESS manufactured by the AT&T Company. The voice messaging system used in the present embodiment of the invention is a type SIERRA made by Octel Equipment Corporation of Milpitas, Calif. The details of the MTSO, the programmable central office switch 26 and the voice messaging system 24 are well known to those of ordinary skill in the telephone communication arts and therefore need not be discussed in further detail.

When programmable central office switch 26 receives a call from an incoming telephone 30, the central office switch directs the call to a receiving telephone 40. For business subscribers, the receiving telephone 40 is provided with one or more incoming telephone lines 50, also called terminals, on which to receive incoming calls. Each of the incoming telephone lines is coupled to the central office switch 26. The set of incoming telephone lines 50 is referred to as a hunt group. Each telephone line in the hunt group has its own unique line equipment number (LEN) and may or may not have an individual hunt group telephone number (nxx-0001, nxx-0002, nxx-0003 . . . , etc.) associated with it as well. The hunt group 50 has its own hunt group directory number 56 that is associated with the entire hunt group. In prior implementations of a hunt group, when a caller dialed the hunt group directory number 56, the central office switch 26 caused one of the incoming telephone lines that are included in the hunt group to ring. This was accomplished by sequentially determining if each of the line equipment numbers associated with the individual telephone lines was idle. If one of the line equipment numbers was idle, the call was routed to the idle line so that the receiving telephone 40 could answer the line to receive the incoming call.

As will be appreciated by those skilled in the art, the programmable central office switch 26 can be programmed to provide features to a given telephone number. Such features may include such commonly known features such as call waiting, call forwarding, etc. Additionally, the features may include such services as: call queuing, whereby a call is placed in a queue until a telephone line becomes idle; call forward busy line to VMS, whereby a call is transferred to the voice message system if the line being called is busy; or call forward don't answer to VMS, whereby a call is forwarded to a voice messaging system if the line being called doesn't answer after a predetermined number of rings.

Currently, all programmable central office switches conform to industry standards. These standards dictate that features will be provided in a prioritized fashion, i.e., the central office switch will always apply the selected features in a predefined order. For example, the 1AESS or the 5ESS switches described above always place call queuing higher in the priority scheme than call forwarding. That is to say, for a telephone number that has both queuing and call forwarding features enabled, the queuing feature will always be executed before the call forwarding feature. As will be explained in further detail below, it is this priority scheme which has heretofore been thought to prevent telephone companies from being able to construct hunt groups having both queuing and voice message capabilities.

The features described above are associated in the programmable central office switch with an individual hunt group telephone number that is assigned to an individual telephone line. The selected features for a given telephone number are enabled by a telephone service representative when a user's service is being set up. A service representative programs the central office switch to provide the features that the customer wants. However, in the prior art, there was no way to alter the priority of the features that can be implemented by the central office switch. The features were always prioritized such that it was the queuing feature of a telephone number that was always implemented before the call forwarding features of a telephone number. It is the purpose of the present invention to program existing programmable central switches in a way that allows a service representative to build a hunt group that gives a caller the option of leaving a message in the voice messaging system and hanging up or being placed in a telephone queue and waiting for an available line.

Figure 2:
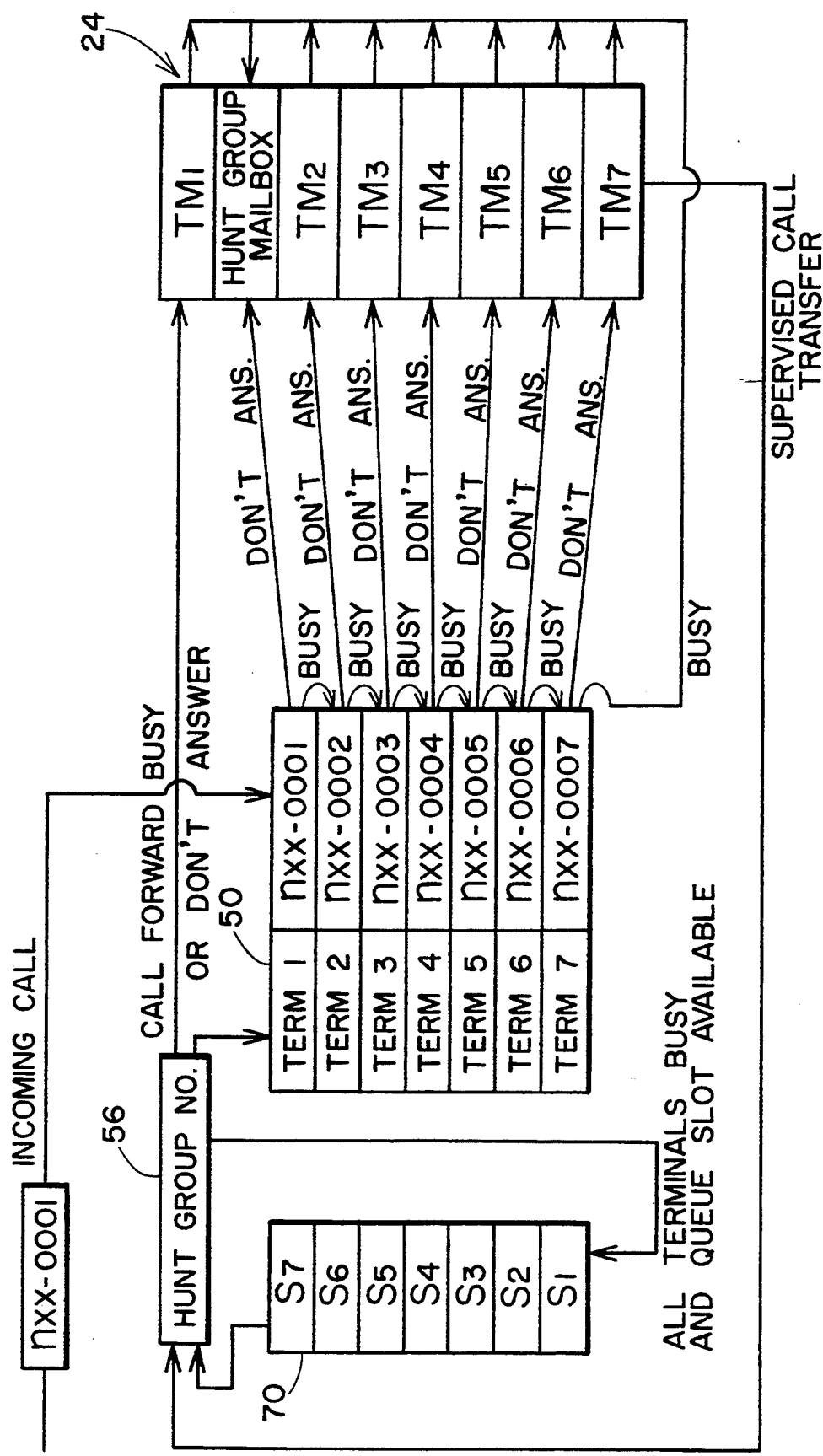
FIG. 2 is a call flow diagram showing the operation of the call routing system according to the present invention.

FIG. 2 is a call flow diagram showing the call routing system according to the present invention. As described above, the present inventive call routing scheme is designed to work with existing programmable central office switches that apply selected features to a given telephone number in a prioritized fashion, wherein the priority of the queuing function is higher than the priority of the call forwarding functions.

In the present invention, a hunt group 50 is comprised of one or more incoming telephone lines or terminals. For purposes of illustration, the hunt group 50 is shown having seven terminals (term 1, term 2 . . . term 7). Each telephone line in the hunt group 50 has an associated individual hunt group telephone number (nxx-0001, nxx-0002 . . . nxx-0007). Each of the individual hunt group telephone numbers has the features call forward busy line to the voice messaging system and call forward don't answer to the voice messaging system enabled but does not have a queuing feature enabled. With the exception of the first individual hunt group telephone number (nxx-0001), the remaining individual hunt group telephone numbers are not published and are used only for internal routing of calls and direct access to each incoming telephone line that is included in the hunt group. A caller could call any of the incoming telephone lines that make up the hunt group directly. For example, a caller could ring line 3 of the hunt group by dialing nxx-0003.

As described above, the hunt group 50 has an associated hunt group directory number 56 having the queuing feature, and call forward busy line to voice messaging system and call forward don't answer to voice messaging system features enabled. In prior art hunt group schemes, the hunt group directory number 56 was the number that was published. When a caller dialed the hunt group directory number 56, the central office switch would try to connect the caller to an idle telephone line in the hunt group by sequentially hunting to each line equipment number (term 1 . . . term 7) of the lines that comprised the hunt group to determine if a line was idle. If all the line equipment numbers were busy, the call was placed in a queue 70. The queue 70 contained a number of slots $S_1-S_7$ in which the call was held until one of the telephone lines became idle.

In contrast to 'the prior art telephone routing system, an incoming call to the hunt group 50 is received on one of the individual hunt group telephone numbers (nxx-0001 . . . nxx-0007) as opposed to the hunt group directory number 56. In the preferred embodiment of the present invention, all incoming calls are received on the published individual hunt group telephone number, which is typically the first individual hunt group telephone number, nxx-0001. If the telephone line associated with the individual hunt group telephone number on which the call was received is busy, the central office switch 24 automatically routes the call to the next individual hunt group telephone number, nxx-0002. This process continues until all of the individual hunt group telephone numbers have been tried or until an idle telephone line in the hunt group is found. If all of the telephone lines that comprise the hunt group are busy, the call is forwarded from the last individual hunt group telephone number to a common hunt group mailbox that is set up within the voice messaging system 24.

Additionally, the voice messaging system 24 is set up to include a series of transfer mailboxes, $TM_2$-$TM_7$, that are associated with each individual hunt group telephone number and a transfer mailbox $TM_1$ that is associated with the hunt group directory number 56. A telephone call will be forwarded to an individual hunt group telephone number's associated transfer mailbox if a call is not answered on that number's associated telephone line within a predetermined number of rings, i.e., the don't answer condition. This is the "call forward don't answer to voice messaging system" feature provided by the programmable central office switch. When the call is forwarded to a telephone line's associated transfer mailbox, it is immediately forwarded by the voice messaging system to the common hunt group mailbox.

Once the incoming call has been forwarded to the common hunt group mailbox, a message is played to the caller asking whether the caller wishes to leave a voice message or be placed in a queue. The caller preferably selects his or her option by pressing a touch tone key on the telephone. If the caller selects to leave a message, the message is recorded by the voice messaging system and stored in the common hunt group mailbox. If the caller wishes to join the queue, the voice messaging system performs a supervised call transfer to the hunt group directory number 56. If all of the telephone lines that comprise the hunt group are still busy, and there are no available slots in the queue 70, then the hunt group directory number 56 will produce a busy signal. The supervised call transfer recognizes the busy signal and pulls the telephone call back to the common hunt group mailbox wherein another message is played indicating all telephone lines are currently busy and the caller should try again later or leave a message. If one of the telephone lines that comprise the hunt group is idle or a slot is available in the queue, the hunt group directory number 56 will ring and the voice messaging system will attempt to transfer the call to the hunt group directory number 56. The software that is provided by the programmable central office switch for the hunt group directory number 56 then takes over to place the call to the idle telephone line or to place the call in the queue. If after a predetermined time all the telephone lines in the hunt group are still busy or one of the telephone lines becomes available and is not answered after a predetermined number of rings, the call is again forwarded to the transfer mailbox $TM_1$ and then transferred again to the common hunt group mailbox, where another message is played instructing the caller that all lines are busy and the caller can either leave a message or try again later. The caller selects the option of leaving a message by pressing the appropriate touch tone key or hangs up.

Figure 3:
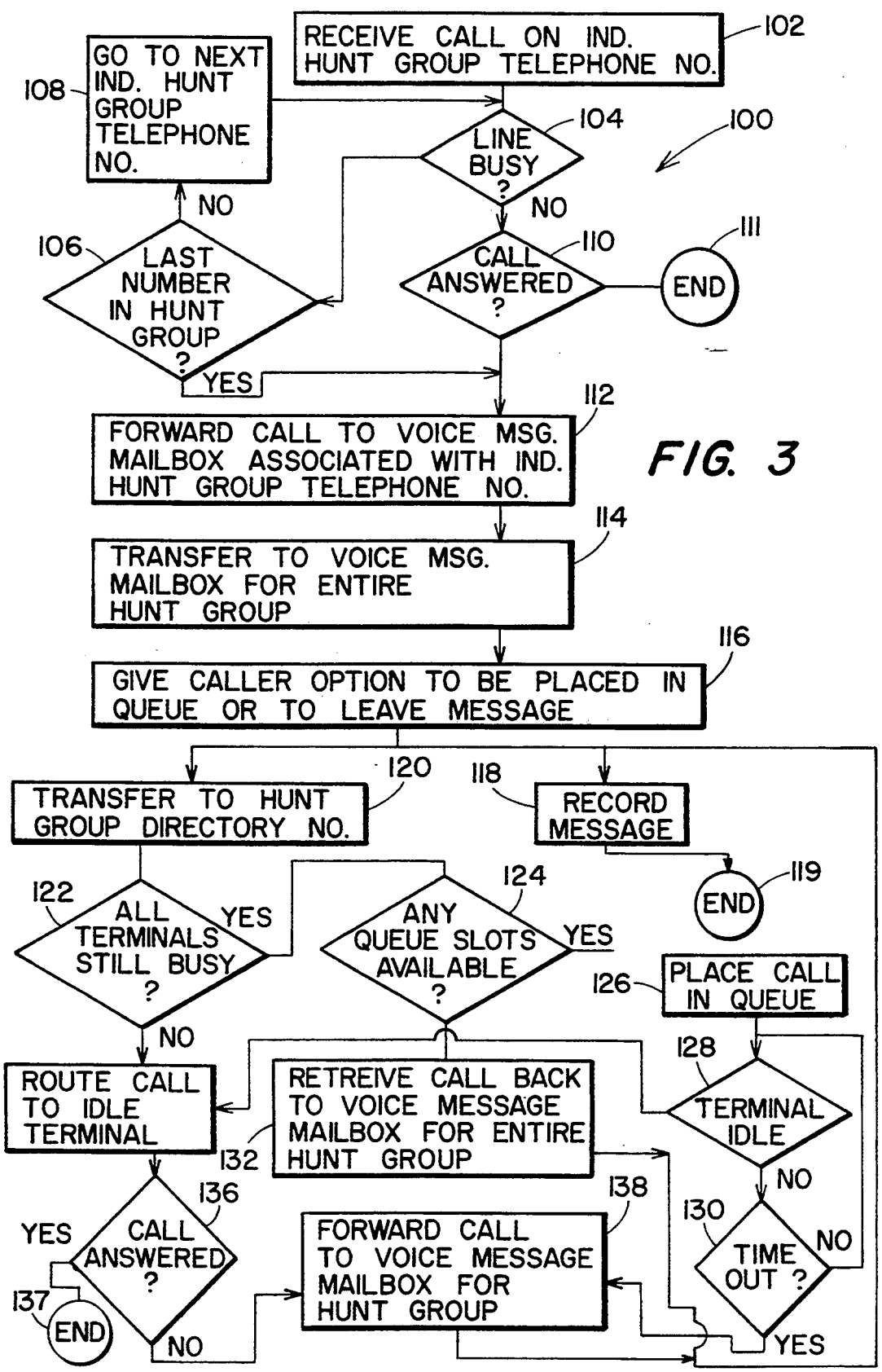
FIG. 3 is a flow diagram showing how the present invention provides both voice message and queuing capabilities to a multi-line hunt group.

FIG. 3 is a flow chart showing the steps performed by a method of routing telephone calls according to the present invention. As described above, the purpose of the present invention is to allow the construction of a hunt group having both queuing and voice messaging features with existing programmable telephone switches and software so that a caller has the option of being placed in a queue or leaving a message when all of the telephone lines of the hunt group are busy. The method 100 begins at a step 102 when a call is received on an individual hunt group telephone number. As described above, the published telephone number for the hunt group is typically the first individual hunt group telephone number and not the more general hunt group directory number 56 shown in FIGS. 1 and 2. At step 104, it is determined if the telephone line associated with the individual hunt group telephone number called is busy. If so, the method then determines if the individual hunt group telephone number called is the last number in the hunt group at step 106. If not, the next individual hunt group telephone number in the hunt group is tried at a step 108. If the telephone line was not busy at the step 104, it is determined if the call was answered at a step 110. If so, the call routing method ends at step 111. If the call is not answered, the method proceeds to a step 112, wherein the call is forwarded to a voice messaging transfer mailbox that is associated with the individual hunt group telephone number. From the transfer mailbox, the call is routed to the common voice message mailbox for the entire hunt group at a step 114. Note that in the present embodiment of the invention, this step is not performed if the call is being forwarded from the first individual hunt group telephone number because the common voice message mailbox for the hunt group is associated with the first individual hunt group telephone number. In the common voice message mailbox, the caller is given an option to leave a message or be placed in a call waiting queue in a step 116. If the caller decides to leave a message, the message is recorded at a step 118 before the method ends at step 119.

Assuming the caller wishes to be placed in a queue, the incoming call is transferred using a supervised call transfer at a step 120 from the common voice message mailbox to the hunt group directory number 56 shown in FIGS. 1 and 2. After the call is transferred to the hunt group directory number, the central office switch determines if all telephone lines that comprise 'the hunt group are still busy at a step 122. If all telephone lines are busy, it is then determined if there are any queue slots available at a step 124. If a slot is available, the call is placed in the queue at a step 126 and the hunt group is monitored to determine whether a telephone line becomes idle at a step 128 or whether the call has remained in the queue for longer than a predetermined maximum time at a step 130. The method continues to check whether a telephone line in 'the hunt group becomes idle until the predetermined length of time elapses. If no telephone line becomes idle after the predetermined time has elapsed, the call is again forwarded from the hunt group directory number 56 to the common voice message mailbox at step 138.

If at step 124 it was determined that no queue slots are available, the hunt group directory number 56 rings busy so that the voice messaging system knows to retrieve the call back to the common voice message mailbox at step 132 using the supervised call transfer as described above. Alternatively, if when the call was transferred to the hunt group directory number 56 it was determined that a telephone line in the hunt group was idle at step 122, the call is routed to the idle telephone line at a step 134. It is then determined if the call is answered at a step 136. If so, the method ends at step 137. If the call is not answered, the incoming call is forwarded to the common voice message mailbox so that the caller can leave a message at step 138.

As can be seen, the present invention is a call routing system that allows a hunt group to be constructed using existing programmable switching hardware and software such that the hunt group has both voice messaging and queuing features. No specialized switching hardware or customized computer software is necessary to implement the present inventive call routing system. Using the invention, the order of prioritized call features can be bypassed to allow a caller the option of being placed in queue or leaving a message using the voice message system.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of routing a telephone call to one or more telephone lines comprising:
   providing a Central Office Switch (COS) in electrical communication with a voice messaging system (VMS) and having prioritized features including queuing, call forward don't answer to the VMS and call forward busy line to the VMS;
   providing said one or more telephone lines so as to form a hunt group, each of the telephone lines having
   (a) a telephone number and provided in electrical communication with the hunt group mailbox,
   (b) the call forward busy don't answer to the VMS feature enabled, and
   (c) the call forward busy line to the VMS feature enabled;
   providing a hunt group directory associated with the hunt group and having a corresponding hunt group telephone number, the hunt group directory having queuing, call forward don't answer to the VMS and the call forward busy line to the VMS features enabled;
   automatically routing the call to the first idle telephone line of the hunt group;
   if the call is not answered after a predetermined number of rings, applying call forward don't answer treatment to the call at the telephone line and automatically forwarding the call to the VMS hunt group mailbox;
   if an idle telephone line is not located after a hunt of all of the telephone lines in the hunt group, applying call forward busy treatment to the call at the telephone line and automatically forwarding the call to the hunt group mailbox;
   once the call has been received by the hunt group mailbox, playing a recorded message which provides a calling party the option of disconnecting, leaving a message, or placing the call in queue; and
   transferring the call to the hunt group directory if the caller selects the option of placing the call in queue.

2. The method of routing a telephone call as in claim 1, further comprising:
   after the call has been transferred to the hunt group directory determining if,
   (a) any of the telephone lines of the hunt group are idle, and
   (b) if the queue includes an empty slot;
   if one of the telephone lines is idle, forwarding the call to the idle telephone line;
   if no telephone line is idle and the queue contains an empty slot, placing the call in queue; and
   if no telephone line has become idle and the queue does not contain an empty slot, applying call forward busy treatment to the call as the hunt group directory and forwarding the call the VMS hunt group mailbox.

3. The method of routing a telephone call as in claim 2, wherein the step of applying call forward don't answer treatment to the call comprises;
   providing a plurality of transfer mailboxes in the voice messaging system each associated with a telephone line of the hunt group; and
   receiving the call from an idle telephone line of the hunt group that has not been answered and forwarding the call to the VMS hunt group mailbox.

4. A telephone call routing system, comprising:
   a Voice Messaging System (VMS) having a common hunt group mailbox;
   a programmable Central Office Switch (COS) provided in electrical communication with the VMS and having prioritized features including queuing, call forward don't answer to the VMS and call forward busy line to the VMS;
   one or more telephone lines that form a hunt group, each of the telephone lines having
   (a) a telephone number and provided in electrical communication with the hunt group mailbox,
   (b) the call forward don't answer to the VMS feature enabled, and
   (c) the call forward busy line to the VMS feature enabled; and
   a hunt group directory associated with the hunt group and having a corresponding hunt group telephone number, the hunt group directory having queuing, call forward don't answer to the VMS and call forward busy line to the VMS features enabled,
   whereby the COS is operative to automatically route a call placed to one of said one or more telephone lines to the first available telephone line of the hunt group and if a hunt of all the telephone lines in the hunt group does not locate an idle line, the COS applies call forward busy treatment to the call at the telephone line and automatically forwards the call to the VMS hunt group mailbox, whereupon a calling party is provided the option of disconnecting the call, leaving a message, or placing the call in queue, the COS further operative to automatically transfer the call to the hunt group directory if the option of placing the call in queue is selected by the calling party.

5. A telephone call routing system as in claim 4 wherein the VMS further includes a plurality of transfer mailboxes each provided in electrical communication with the hunt group mailbox and a corresponding telephone line of the hunt group, each of the transfer mailboxes operative to receive a call if call forward don't answer treatment is applied at its corresponding telephone line and automatically transfer the call to the hunt group mailbox.

* * * * *